July 26, 1966 R. D. WIGHT 3,262,332

TELESCOPEABLE STEERING ASSEMBLY

Filed March 19, 1965 2 Sheets-Sheet 1

INVENTOR.
Robert D. Wight
BY
W. F. Wagner
ATTORNEY

July 26, 1966 R. D. WIGHT 3,262,332
TELESCOPEABLE STEERING ASSEMBLY
Filed March 19, 1965 2 Sheets-Sheet 2

INVENTOR.
Robert D. Wight
BY
W. F. Wagner
ATTORNEY

3,262,332
TELESCOPEABLE STEERING ASSEMBLY
Robert D. Wight, Saginaw, Mich., assignor to General Motors Corporation, Detroit, Mich., a corporation of Delaware
Filed Mar. 19, 1965, Ser. No. 441,038
12 Claims. (Cl. 74—493)

This invention relates to steering assemblies and more particularly to steering assemblies capable of telescoping movement in response to imposition of a predetermined axial load thereon.

An object of the invention is to provide an improved steering assembly.

Another object is to provide a steering assembly in which portions thereof are adapted for telescoping movement responsive to impact from either end thereof relative to a fixed intermediate portion.

Still another object is to provide an arrangement of the type described which is constructed and arranged so that telescoping movement of one end thereof does not displace the other end, and vice-versa.

A still further object is to provide an arrangement of the type described including energy absorbing means for imposing a controlled rate of telescoping movement.

These and other objects, advantages and features of the invention will become more readily apparent as reference is had to the accompanying specification and drawings wherein.

Figure 1:
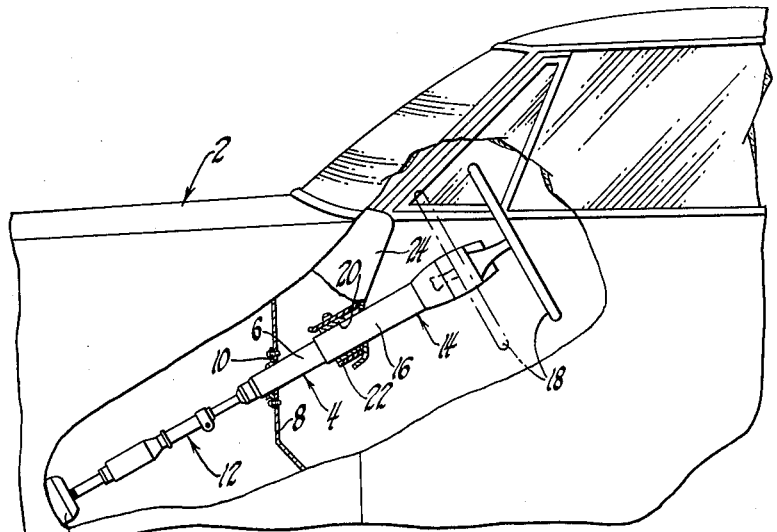
FIGURE 1 is a fragmentary plan view of a motor vehicle incorporating a steering assembly in accordance with the invention.

Referring now to the drawings and particularly FIGURE 1, the reference numeral 2 generally designates a vehicle body, a portion of which is broken away to reveal a steering assembly 4 which includes a nonrotatable intermediate column 6 fixed to the vehicle fire wall 8 by a flange mount 10. Axially aligned with column 6 and telescopingly movable relative thereto are lower portions 12 and upper portions 14, the latter of which includes a nonrotatable jacket 16 and a conventional steering wheel 18. The lower portion of jacket 16 is supported by a low friction bushing 20 mounted in a cylindrical housing 22 mounted on the lower surface of the vehicle instrument panel 24, while the lower portion 12 operatively engages a conventional steering gear box assembly 26 which in turn is conventionally mounted on the vehicle frame, not shown. In accordance with the general features of the invention, lower portion 12 is constructed and arranged, in a manner shortly to be described, so that in the event of vehicle impact with an obstacle which would cause the gear box 26 to be displaced rearwardly relative to the frame, such displacement is accommodated by axial telescoping movement of portion 12 into intermediate column 6 rather than imposing rearward displacement of the entire assembly 4 in the direction of the vehicle operator. Similarly, the upper portion 14 and steering wheel 18 are adapted for downward displacement through low friction bushing 20 of support 22 and simultaneous telescoping displacement into intermediate column 6 in the event of an occurrence causing the vehicle operator to be thrown forwardly against the wheel.

Figure 2:
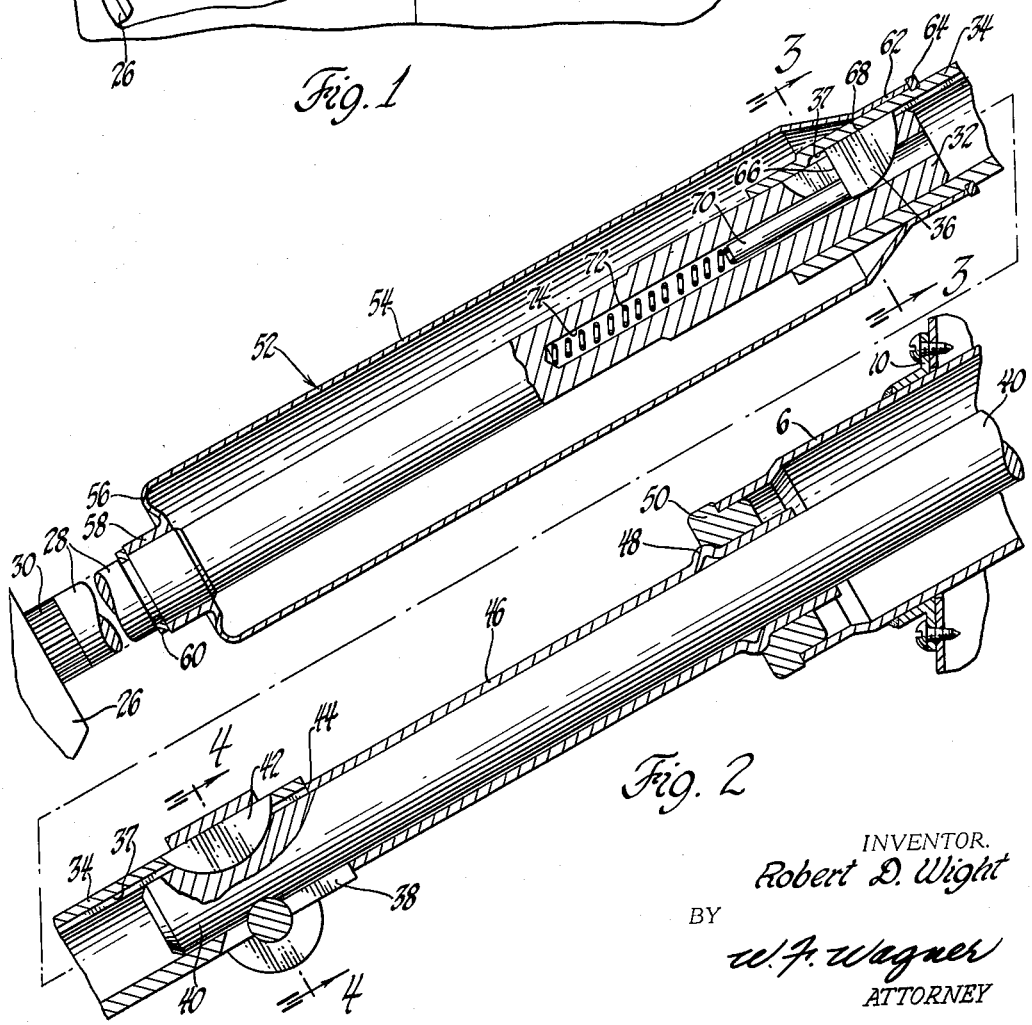
FIGURE 2 is a greatly enlarged sectional elevational view illustrating the details of construction of the lower portion of the steering assembly.
Figure 3:
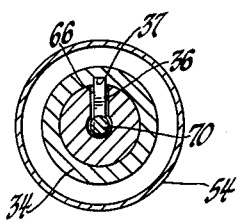
FIGURE 3 is a view looking in the direction of arrows 3—3 of FIGURE 2.
Figure 4:
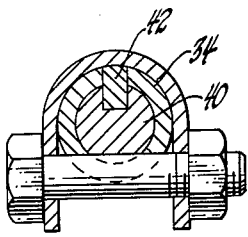
FIGURE 4 is a view looking in the direction of arrows 4—4 of FIGURE 2.

As seen best in FIGURE 2, lower portion 12 includes a lower steering shaft 28, the lower end 30 of which is splined to gear box 26, while the upper end 32 thereof is keyed to a tubular portion 34 by a quarter Woodruff key 36 which tracks in a longitudinal groove 37 formed in the tubular portion. The upper end 38 of tubular portion 34, in turn, is keyed to an intermediate steering shaft 40 by a Woodruff key 42. Abutting the upper end 38 of tubular portion 34 is the lower end 44 of a sleeve 46 which closely surrounds shaft 40. Near its upper end, sleeve 46 is formed with a circumferential bulge 48 which engages a thrust bearing 50 formed at the lower end of intermediate column 6 forwardly of flange mount 10.

In order to control the rate of telescoping displacement of portion 12 relative to the vehicle fire wall 8 in the event of impact on gear box 26, there is provided a first energy absorber 52 in the form of an elongated aluminum tube having a cylindrical wall portion 54, the lower end of which is turned inwardly to define an initial reentrant folded portion 56 radially adjacent to a necked-in sleeve portion 58 which is maintained relative to shaft 28 by a thrust ring 60. At its upper end, cylindrical wall 54 tapers into a neck portion 62 which is similarly maintained relative to tubular member 34 by a thrust ring 64. In practice, when an axial load of sufficient magnitude is imposed on gear box 26, any resultant rearward movement causes shaft 28 to telescope upwardly within tube 34, while the cylindrical wall 54 progressively reentrantly folds to dissipate the energy of impact. In addition to energy absorber 52, further controlled resistance to displacement of gear box 26 is accomplished by imparting a thrust load on the surface 66 of quarter Woodruff key 36 so that the outer surface 68 thereof provides constant frictional drag as the upper end of shaft 28 telescopes within the tube 34. In the embodiment shown, the thrust load on quarter Woodruff key 36 is accomplished by a pin 70 and compression spring 72 arranged in axial alignment in a central bore 74 of shaft 28.

Figure 5:
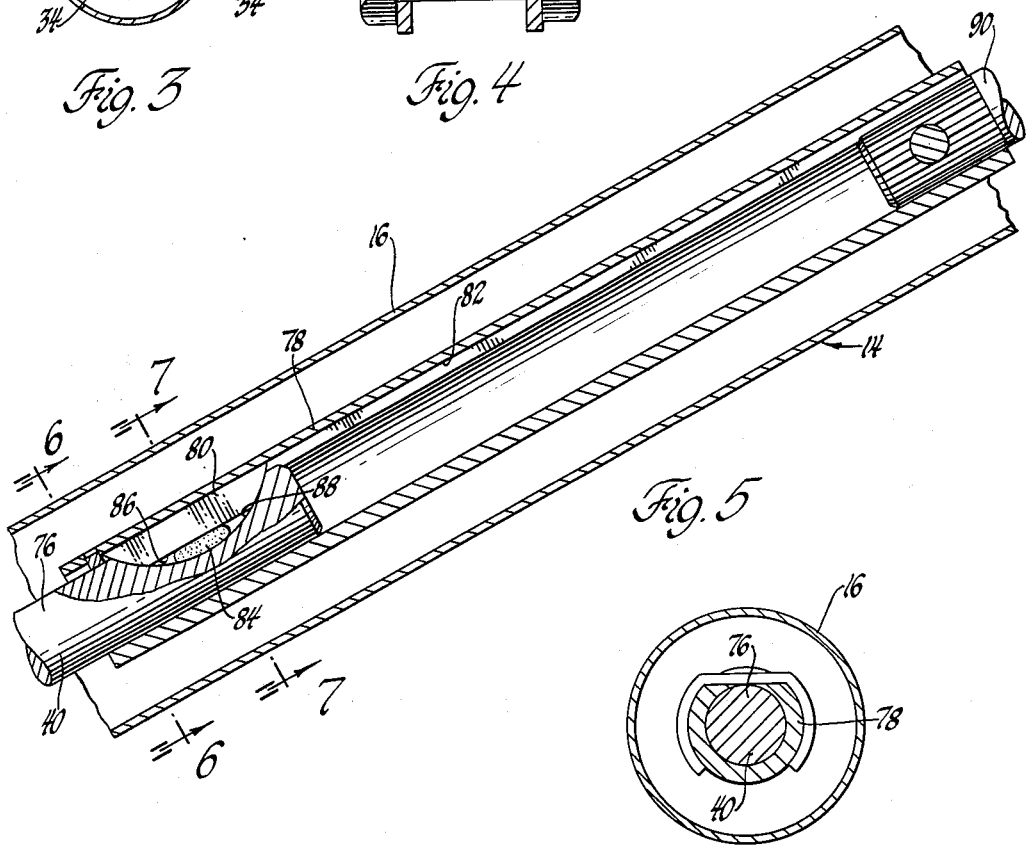
FIGURE 5 is a greatly enlarged sectional elevational view illustrating the details of construction of the upper portion of the steering assembly.
Figure 6:
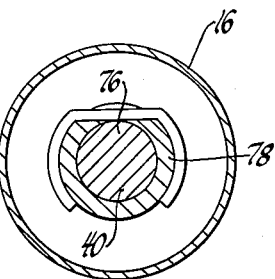
FIGURE 6 is a view looking in the direction of arrows 6—6 of FIGURE 5.
Figure 7:
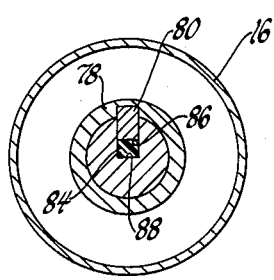
FIGURE 7 is a view looking in the direction of arrows 7—7 of FIGURE 5.

As seen best in FIGURE 5, in order to accommodate axial downward displacement of upper portion 14 and wheel 18, the upper extremity 76 of intermediate shaft 40 extends into the lower end of an upper tubular portion 78 and is keyed therein by a Woodruff key 80 which tracks in a longitudinal groove 82 in portion 78. Key 80 is directly preloaded into frictional engagement with groove 82 by an elastomer slug 84 disposed between the lower face 86 of the key and the bottom of the curved slot 88. Since the upper end of the upper tubular portion 78 in turn is connected to steering wheel 18 by a stub shaft 90, it will be seen that in the event the vehicle operator is thrown forward against wheel 18, the upper tubular portion will telescope downwardly relative to shaft 40, while the jacket 16 correspondingly moves downwardly through low friction bushing 20 in support 22.

When constructed in accordance with the invention, the steering column assembly enables either individual or concurrent controlled telescoping movements of the lower section 12 or upper section 14. Of particular significance is the fact that while either end of the assembly may telescope toward the intermediate column 6, separate telescoping movement of lower section 12 toward column 6 does not cause upper section 14 to telescope away from column 6 toward the operator.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:
1. A steering assembly comprising a fixed intermediate portion, upper and lower portions axially aligned with said intermediate portion, and means responsive to predetermined axial load on said upper and lower portions enabling telescoping movement thereof into said intermediate portion.

2. A steering assembly comprising a fixed intermediate portion, upper and lower portions axially aligned with said intermediate portion, and means responsive to predetermined axial load on said upper and lower portions enabling independent telescoping movement thereof into said intermediate portion.

3. A steering assembly comprising a fixed intermediate portion, upper and lower portions axially aligned with said intermediate portion, and means responsive to predetermined axial load on said upper and lower portions enabling concurrent telescoping movement thereof into said intermediate portion.

4. In a vehicle, a steering assembly comprising a steering gear box fixed to said vehicle, a telescopeable steering shaft assembly connected at one end to said gear box and having a steering wheel mounted on the other end thereof, an intermediate column surrounding said shaft assembly and rigidly connected to said vehicle, and energy absorbing means interposed between said shaft assembly and said column operative to impart controlled resistance to telescoping movement of said shaft assembly in either direction.

5. The structure set forth in claim 4 wherein said energy absorbing means includes a cylindrical member surrounding a portion of said shaft assembly between said gear box and said column.

6. The structure set forth in claim 5 wherein said cylindrical member is maintained in thrust absorbing relation between said shaft and column so that telescoping movement of the former into the latter induces reentrant folding of said cylindrical member.

7. The structure set forth in claim 6 wherein said shaft assembly comprises at least one shaft member slidably engaging a surrounding sleeve member, and interconnecting means keying said members together against relative rotation only.

8. The structure set forth in claim 7 wherein said interconnecting means comprises a Woodruff key carried by one of said members and slidably engaging a longitudinally extending slot formed in the other of said members.

9. The structure set forth in claim 8 including means for preloading said Woodruff key to establish predetermined frictional engagement with said slot.

10. The structure set forth in claim 9 wherein said preloading means comprises spring means extending axially of said members.

11. The structure set forth in claim 10 wherein said preloading means comprises elastic means acting transversely of said members.

12. A telescopeable drive assembly comprising a tube having a longitudinal keyway formed therein, a shaft extending into said tube, a Woodruff key carried by said shaft and engaging said keyway, and resilient means carried by said shaft urging said key into frictional engagement wtih said keyway to provide predetermined controlled resistance to telescoping movement of said shaft and tube.

References Cited by the Examiner
UNITED STATES PATENTS

| | | | |
|---|---|---|---|
| 1,499,432 | 7/1924 | Williston et al. | 287—53 |
| 1,688,649 | 10/1928 | O'Connor | 287—53 |
| 2,787,485 | 4/1957 | Frisell. | |
| 2,905,018 | 9/1959 | Kokko | 74—503 |
| 3,058,367 | 10/1962 | Hoffman | 74—493 |
| 3,167,974 | 2/1965 | Wilfert | 74—492 X |

FOREIGN PATENTS

| | | |
|---|---|---|
| 1,028,225 | 2/1953 | France. |
| 742,746 | 1/1956 | Great Britain. |
| 908,910 | 10/1962 | Great Britain. |

BROUGHTON G. DURHAM, *Primary Examiner.*

C. F. GREEN, *Assistant Examiner.*